United States Patent Office 2,935,947
Patented May 10, 1960

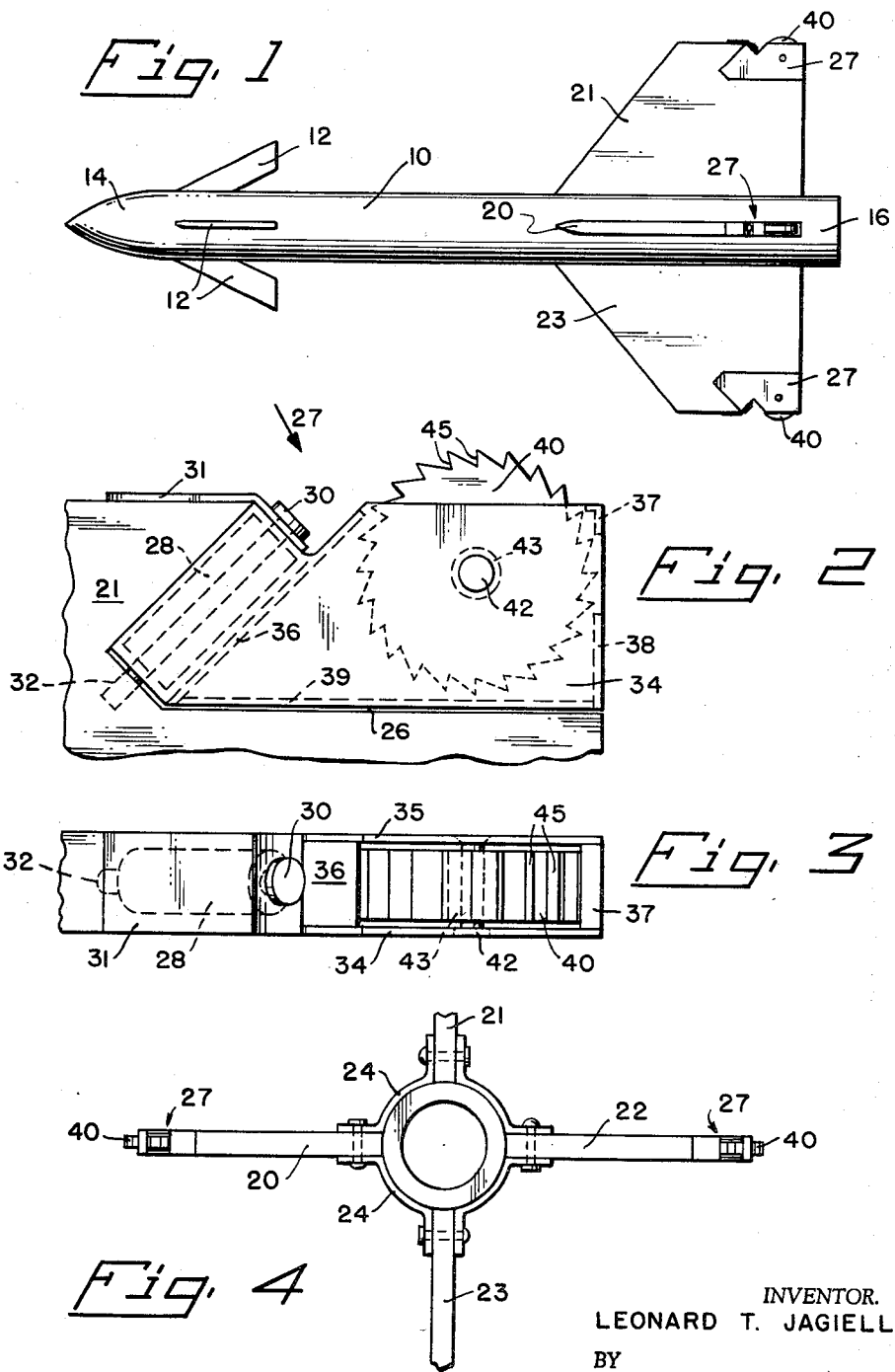

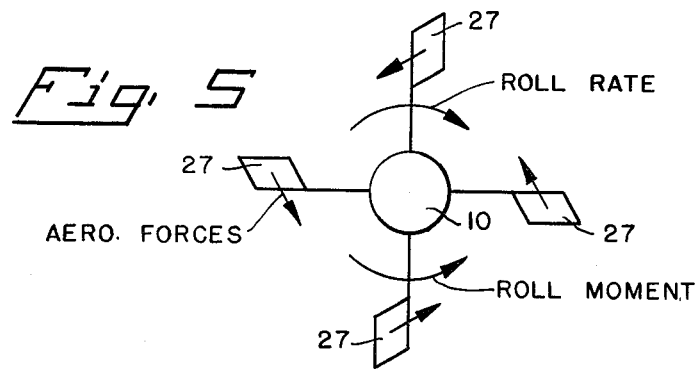
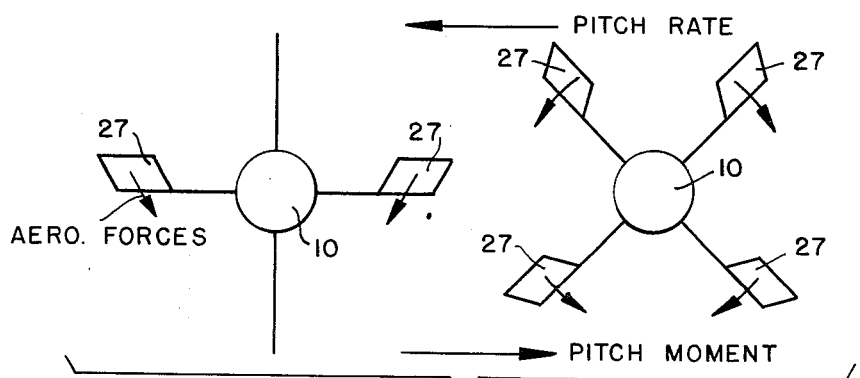
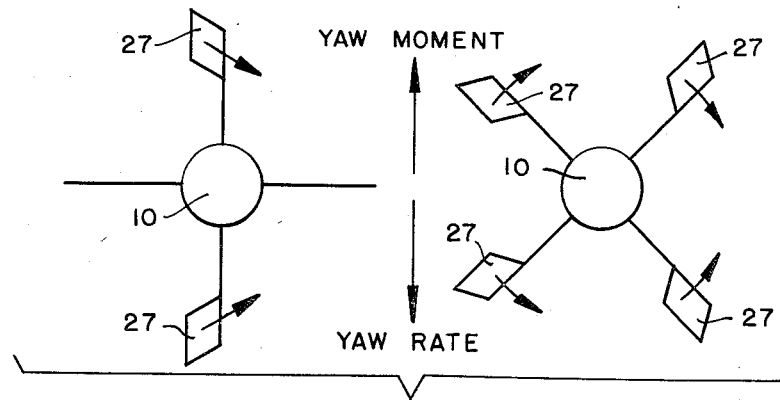

2,935,947
THREE AXIS GYROSCOPIC AERODYNAMIC DAMPING SYSTEM

Leonard T. Jagiello, China Lake, Calif., assignor to the United States of America as represented by the Secretary of the Navy Application September 23, 1958, Serial No. 762,896

11 Claims. (Cl. 102—50)

(Granted under Title 35, U.S. Code (1952), sec. 266)

The invention herein described may be manufactured and used by or for the Government of the United States of America for governmental purposes without the payment of any royalties thereon or therefor.

The present invention relates to aerodynamic damping systems and more particularly to a three axis gyroscopic damping system for missiles and aircraft wherein aerodynamic damping is provided about the pitch, yaw, and roll axes of an airborne vehicle.

The present invention is an improvement over "Gyroscopic Roll Control System for Aircraft" by Sydney R. Crockett, U.S. Patent 2,775,202, issued December 25, 1956. The system of the present invention directly utilizes gyroscopic precession torques to deflect appropriately hinged and damped aerodynamic centering control surfaces so arranged that the resulting aerodynamic control forces act in a manner to damp any pitching, yawing or rolling motions of the airborne vehicle. The gyroscopes are mounted in the control surfaces of the vehicle, the surfaces being hingedly connected to the vehicle fins at an angle to provide correction of pitch, yaw, and roll motions of the vehicle by providing damping at the hinged connection. U.S. Patent 2,775,202 provides roll control, but does not provide pitch and yaw control as well, as does the present invention.

An object of the present invention is to provide improved and simplified means to control roll, pitch and yaw in missiles and aircraft.

Another object of the invention is to provide simplified roll, pitch and yaw control means energized by the airstream and acting directly on the control surface to prevent or limit roll, pitch and yaw of an airborne vehicle.

A further object of the invention is to provide simplified gyroscopic aerodynamic damping system for controlling roll pitch and yaw motions of an airborne vehicle.

Other objects and many of the attendant advantages of this invention will become readily appreciated as the same becomes better understood by reference to the following detailed description when considered in connection with the accompanying drawings wherein:

Fig. 1 is a diagrammatic view in side elevation of an airborne vehicle with roll, pitch and yaw control apparatus embodying the invention;

Fig. 2 is an enlarged view in elevation of one of the control devices shown in Fig. 1;

Fig. 3 is a plan view of the device shown in Fig. 2;

Fig. 4 is a view of the airborne vehicle of Fig. 1 from the rear, showing the control surfaces;

Fig. 5 is a view as in Fig. 4, showing the control surfaces in deflected position to reduce the angular rate of roll of the vehicle;

Fig. 6 shows a view as in Fig. 4, showing the control surfaces in deflected position to reduce the angular rate of pitch for any roll orientation of the vehicle;

Fig. 7 shows a view as in Fig. 4, showing control surfaces in deflected position to reduce the angular rate of yaw for any roll orientation of the vehicle.

Referring now to the drawings like numerals refer to like parts in each of the figures.

The device shown by way of illustration in the drawings is an airborne vehicle having a body 10, forward control fins 12, an ogive 14, and a power plant 16, all of known design.

Toward the rear of the body 10 are mounted four wings 20, 21, 22, 23 fixed perpendicular to the outer surface of the body and spaced 90 degrees apart by means of straps 24, for instance, riveted or otherwise secured to the wings and to each other. At its rear outer corner, each of the wings is cut away to form a space 26 to accommodate the control surfaces 27.

As shown in Figs. 1 and 2, each of the control surfaces includes a forward post 28 positioned at an angle of about 45 degrees to the longitudinal axis of the vehicle. This angle may vary to some extent, but 45 degrees is the preferred angle. Post 28 is bored to receive a hinge pin 30 which extends through a hinge mount 31 on the wing, through post 28 and into a socket indicated at 32. Hinge pin 30 is slightly smaller in diameter than the bore through post 28; the space between the pin and the bore is filled with a highly viscous fluid which will produce a force which is proportioned to the velocity of relative motion between the pin and the bore, thus providing a hinge damper to prevent unstable oscillation of the control surfaces. In actual use the pin is fixed and the bore moves around the pin, and the hinges are oriented normal to the centerline of symmetry of the vehicle. The body of each control surface 27 is formed with opposite plates 34, 35 which are held in spaced relation by means of spacers indicated at 36, 37, 38, 39, thus forming a compartment, open at the top as viewed in Figs. 2 and 3, to house a gyro-wheel 40.

The axle 42 of gyro-wheel 40 is mounted in anti-friction bearing 43 in plates 34 and 35. The gyro-wheel extends through the opening between spacers 36 and 37 so as to be exposed to the air stream when the vehicle is in flight. The periphery of the gyro-wheel is provided with buckets or vanes 45 to act as impellers and cause the gyro-wheel to rotate in the clockwise direction as viewed in Fig. 2. If desired, means may be provided to impart an initial angular velocity to the gyro-wheel prior to or simultaneously with the starting of the power plant, so that it will be functioning when the vehicle is launched.

As can be seen from the drawings, each wing lies in a plane which extends radially outwardly relative to the body 10. Each control surface 27 normally lies in the same respective plane as the wing to which it is attached, and can be moved therefrom during flight only by positive force exerted by the gyro-wheel 40 against the force of air pressure tending to deflect it back into the plane of the wing. The axis of the gyro-wheel 40 is disposed transverse to the plane of the control surface 27, and is thus normally transverse to the plane of the wing. It is not necessary that the gyro-wheels be physically located inside the aerodynamic control surface. Other positioning arrangements may be used whereby the direct precession torque of a properly hinged gyro is utilized to deflect, through linkages or otherwise, an aerodynamic centering control surface for affording damping about the pitch and yaw as well as the roll axis.

Operation

Let it be assumed that the vehicle, Fig. 1, is in flight, without roll, pitch or yaw, and that the gyro-wheels are rotating at sufficient speed to produce adequate control torque. Let it now be assumed that a disturbing torque is created by aerodynamic misalignment, for instance, causing the vehicle to begin to roll, and/or pitch and/or yaw. This roll and/or pitch and/or yaw will move each of the gyro-wheels out of its plane of rotation, causing them to precess about their respective pins 30. The result will be that each of the control surfaces 27 will be deflected, as indicated in Figs. 5, 6 and 7, in such direction as to damp the rolling, pitching and yawing motion, after which each of the surfaces will return to neutral position in the plane of its wing. If the vehicle develops an angular rate or spin about the roll axis, the aerodynamic control surfaces will be deflected, as indicated in Fig. 5, due to precession torque of the gyro-wheels in a direction which will give rise to aerodynamic forces on the control surfaces 27 which will give a roll moment about the roll axis to reduce the angular rate of roll. If the vehicle develops an angular rate of movement about the pitch axis, the aerodynamic control surfaces 27 will be deflected, as indicated in Fig. 6, due to precession torque of the gyro-wheels in a direction which will give rise to aerodynamic forces on the control surfaces which will give a pitch moment about the pitch axis to reduce the angular rate of pitch for any roll orientation of the vehicle. If the vehicle develops an angular rate about the yaw axis, the aerodynamic control surfaces 27 will be deflected, as indicated in Fig. 7, due to precession torque of the gyro-wheels in a direction which will give rise to aerodynamic forces on the control surfaces which will give a yaw moment about the yaw axis to reduce the angular rate of yaw for any roll orientation of the vehicle. The control surfaces 27 will operate to control roll, pitch and yaw whether they occur separately or simultaneously.

Obviously many modifications and variations of the present invention are possible in the light of the above teachings. It is therefore to be understood that within the scope of the appended claims the invention may be practiced otherwise than as specifically described.

What is claimed is:

1. An aircraft comprising an elongated body having a longitudinal axis along the centerline of symmetry thereof, a plurality of wings fixed thereto and extending radially therefrom about said longitudinal axis, a control surface having a recess therein and a hinge portion along one edge thereof being hinged to each of said wings in the plane of the wing and spaced outwardly from said elongated body, the hinge axis of said control surfaces positioned at about a 45 degree angle to the centerline of symmetry of the aircraft, and a gyro-wheel mounted within the recess of said control surface and rotatable on an axis perpendicular to the plane of said control surface.

2. The device defined in claim 1, wherein a portion of the gyro-wheel is exposed to and rotated by the airstream when the aircraft is in flight.

3. The device defined in claim 1, wherein the gyro-wheel is provided with peripheral vanes, and a portion of the periphery of the gyro-wheel projects beyond the edge of the control surface where it is exposed to and operable to be driven by the airstream when the aircraft is in flight.

4. Roll, pitch and yaw control mechanism for an airborne vehicle having an elongated body with its longitudinal axis along the centerline of symmetry thereof and in the line of flight, comprising a frame fixed to said body and extending radially therefrom about said longitudinal axis, a control surface having a hinge portion thereon spaced radially from the longitudinal axis of said body and hinged to said frame, the hinge axis of the hinge portion of said control surface being at an angle of about 45 degrees to the longitudinal axis of said body, a gyro-wheel carried by said control surface with its axis of spin normally perpendicular to the plane of said control surface, and means for rotating said gyro-wheel in such direction that precession of the gyro-wheel due to roll, pitch and yaw of the missile will deflect the control surface in a direction to tend to arrest any roll, pitch and yaw.

5. Roll, pitch and yaw control mechanism for a missile having an elongated body with its longitudinal axis along the axis of symmetry thereof and in the line of flight of the missile, comprising a frame fixed to said body and extending outwardly therefrom about said longitudinal axis, a recessed airfoil having a recess therein and a hinge portion thereon spaced radially from the longitudinal axis of said body and hinged to said frame, the hinge axis of said hinge portion of said airfoil being at an angle of about 45 degrees to the longitudinal axis of said body, a gyro-wheel mounted within said airfoil recess with its axis of spin perpendicular to the plane of said airfoil, and vanes on the periphery of said gyro-wheel extending beyond the outer edge of said airfoil so as to be exposed to the airstream when the missile is in flight thereby to rotate the gyro-wheel in such direction that precession of the gyro-wheel due to any roll, pitch and yaw of the missile will deflect the airfoil in a direction to tend to correct any said roll, pitch and yaw.

6. Roll, pitch and yaw control mechanism for a craft having a body with a longitudinal axis, comprising a frame extending outwardly from the longitudinal axis of said body, a foil having a recess therein and a hinge portion along one edge thereof hinged to said frame on a hinge axis at an angle of about 45 degrees relative to the longitudinal axis of said body, a gyro-wheel mounted within the recess of said foil with its spin axis journaled in said foil perpendicular to the plane of the foil, and means for spinning said gyro-wheel whereby precession thereof due to any roll, pitch and yaw of the craft will deflect said foil.

7. Roll, pitch and yaw control mechanism for a craft having an elongated body with a longitudinal axis, comprising a foil, supporting means for said foil maintaining the same in hinged relation to said body and displaced laterally therefrom about said longitudinal axis, said foil being hinged on an axis positioned at about 45 degrees to said longitudinal axis, a gyro-wheel carried by said foil with its spin axis perpendicular to the plane of the foil, and means for spinning said gyro-wheel whereby any roll, pitch or yaw of the craft will cause precession of the gyro-wheel and deflection of the foil.

8. Roll, pitch and yaw control mechanism for a missile having an elongated body with its longitudinal axis along the centerline of symmetry thereof and in the line of flight, comprising a plane wing fixed to said body and extending outwardly therefrom, a control surface hinged to said wing in the plane of the wing and spaced outwardly from the body on a hinge axis, said hinge axis being positioned at about a 45 degree angle to said longitudinal axis, a gyro-wheel carried by said control surface with its spin axis perpendicular to said control surface, and means for spinning said gyro-wheel in such direction that precession of the gyro-wheel due to any roll, pitch or yaw of the missile will deflect the control surface in a direction to oppose any said roll, pitch or yaw.

9. A missile comprising a body having a longitudinal axis, four flat wings fixed to said body at right angles to each other and extending outwardly therefrom in the plane of said longitudinal axis, a control surface having a hinge portion thereon hinged to each wing in the plane of the wing and the hinge axis of each hinge portion being positioned at about a 45 degree angle to said longitudinal axis, a gyro-wheel carried by each control surface with the gyro-wheel spin axis transverse to the plane of the control surface, and means for spinning said gyro-wheel in such direction that precession thereof due to any roll, pitch or yaw of the missile will deflect the surface in a direction to oppose any such roll, pitch or yaw.

10. A missile comprising a body having a longitudinal axis, a plurality of wings fixed thereto and extending outwardly therefrom about said longitudinal axis, an airfoil having a recess therein hingedly connected to each said wing for movement about a hinge axis, said hinge axis positioned at about 45 degrees to said longitudinal axis and lying in the plane of the wing, and a gyro-wheel mounted within the recess of each said airfoil with its spin axis journaled in said airfoil perpendicular to the plane of the airfoil.

11. The device defined in claim 10, wherein the gyro-wheel is provided with peripheral vanes exposed to and rotated by the airstream when the missile is in flight.

References Cited in the file of this patent

UNITED STATES PATENTS 2,775,202     Crockett _____ Dec. 25, 1956